US012779652B2

(12) United States Patent
Erbele et al.

(10) Patent No.: US 12,779,652 B2
(45) Date of Patent: Nov. 3, 2026

(54) HAND-HELD POWER TOOL

(71) Applicant: Robert Bosch GmbH, Stuttgart (DE)

(72) Inventors: Simon Erbele, Nufringen (DE); Andre Kurz, Filderstadt Bonlanden (DE); Thilo Zimmermann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/519,223

(22) Filed: Nov. 27, 2023

(65) Prior Publication Data

US 2024/0173840 A1 May 30, 2024

(30) Foreign Application Priority Data

Nov. 30, 2022 (DE) ..................... 10 2022 212 839.7

(51) Int. Cl.
*B25F 5/00* (2006.01)
*B25B 21/02* (2006.01)

(52) U.S. Cl.
CPC .............. *B25F 5/001* (2013.01); *B25B 21/02* (2013.01)

(58) Field of Classification Search
CPC ......... B25F 5/02; B25F 5/001; B25B 23/0007
See application file for complete search history.

(56) References Cited

U.S. PATENT DOCUMENTS

| | | | |
|---|---|---|---|
| 8,714,279 B2 | 5/2014 | Nagasaka et al. | |
| 11,285,595 B2 | 3/2022 | Huggenberger | |
| 2003/0121676 A1 | 7/2003 | Ortt et al. | |
| 2004/0163832 A1 | 8/2004 | Riedl | |
| 2011/0147030 A1 | 6/2011 | Blum et al. | |
| 2017/0129092 A1 | 5/2017 | Kimura | |
| 2019/0283222 A1* | 9/2019 | Thorson | B25B 23/147 |
| 2021/0069884 A1* | 3/2021 | Lang | B25B 21/02 |
| 2021/0107131 A1 | 4/2021 | Kuehne et al. | |
| 2021/0138617 A1* | 5/2021 | Czirjak | B25F 5/02 |

FOREIGN PATENT DOCUMENTS

| | | |
|---|---|---|
| DE | 10 2010 031 274 A1 | 6/2011 |
| DE | 10 2019 213 785 A1 | 3/2021 |
| DE | 10 2020 208 347 A1 | 3/2021 |
| EP | 815 948 A2 | 8/2007 |
| EP | 2 075 094 A1 | 7/2009 |
| EP | 572 191 A1 | 11/2019 |
| EP | 4 015 153 A1 | 6/2022 |

* cited by examiner

*Primary Examiner* — Daniel Jeremy Leeds

(74) *Attorney, Agent, or Firm* — Maginot, Moore & Beck LLP

(57) ABSTRACT

A hand-held power tool includes a drive motor and a transmission. The drive motor includes a drive shaft. The transmission is operably connected to the drive shaft and is configured to be driven by the drive shaft. The transmission includes at least one transmission cover configured to close the transmission at least in portions. The at least one transmission cover is arranged at least partially between the drive motor and the transmission. At least one motor component assigned to the drive motor projects at least in portions into the at least one transmission cover.

14 Claims, 3 Drawing Sheets

HAND-HELD POWER TOOL

This application claims priority under 35 U.S.C. § 119 to patent application no. DE 10 2022 212 839.7, filed on Nov. 30, 2022 in Germany, the disclosure of which is incorporated herein by reference in its entirety.

The disclosure relates to a hand-held power tool as disclosed herein.

BACKGROUND

DE 10 2020 208 347 A1 discloses a hand-held power tool with a tool holder and a housing in which at least one transmission unit and an electronically commutated drive motor with a stator and a rotor for driving an insert tool that can be arranged in the tool holder are arranged, with a drive-side transmission flange being assigned to the transmission unit.

SUMMARY

The disclosure is based on a hand-held power tool with a drive motor which has a drive shaft, with a transmission which can be driven by means of the drive shaft, the transmission having at least one transmission cover which closes the transmission at least in sections and is arranged at least in portions between the drive motor and the transmission. It is proposed that at least one motor component associated with the drive motor protrudes at least in portions into the transmission cover.

The disclosure provides a compact hand-held power tool in that at least one associated motor component projects at least in portions into the transmission cover.

The hand-held power tool can be designed as an electrically operated hand-held power tool. The electrically operated hand-held power tool can be designed as a mains-operated or a cordless hand-held power tool. For example, the hand-held power tool can be designed as a screwdriver, a drill driver, or a rotary impact wrench.

The drive motor can be designed as an electrically commutated drive motor, in particular as at least one electric motor. The drive motor is designed such that it can be actuated via a manual switch. When the manual switch is actuated by a user, the drive motor is switched on and the hand-held power tool is put into operation. If the manual switch is not further actuated by the user, the drive motor is switched off. The drive motor can preferably be electronically controlled and/or regulated in such a way that a reversing mode and a specification for a desired rotational speed can be implemented. In reversing mode, the drive motor can be switched between a clockwise direction of rotation and a counterclockwise direction of rotation. To switch the drive motor in reversing mode, the hand-held power tool can comprise a rotation direction switching element, in particular a rotation direction changeover switch.

The drive motor comprises the drive shaft. The drive shaft is mounted in a housing of the hand-held power tool by means of at least one drive shaft bearing. The drive motor can at least drive the transmission by means of the drive shaft. The drive motor can also use the drive shaft to drive an intermediate shaft, a striking mechanism, and/or a tool holder. The drive shaft bearing can, for example, be designed as a ball bearing, a roller bearing, or a plain bearing. The drive shaft bearing is arranged at one end of the drive motor facing the tool holder. The drive shaft can protrude into the intermediate shaft through the transmission. The drive shaft bearing can be arranged in the intermediate shaft so that the drive shaft is mounted in the intermediate shaft by means of the drive shaft bearing. The drive shaft can have a further drive shaft bearing, which is arranged on an end facing away from the drive motor. The drive shaft can then be rotatably mounted in the housing by means of the drive shaft bearing and the additional drive shaft bearing. It is possible that the drive shaft protrudes into the transmission cover and/or engages in the transmission cover. The hand-held power tool can have a tool axis. A rotation axis of the drive shaft can form the tool axis. In particular, "axial" should be understood as essentially parallel to the tool axis. Whereas "radial" should be understood as essentially perpendicular to the tool axis.

The transmission can include the intermediate shaft. The drive motor can be designed to drive the intermediate shaft. For this purpose, the drive motor and the intermediate shaft can be connected to each other by means of the drive shaft and the transmission. The intermediate shaft can be arranged between the drive motor and the tool holder. The transmission can be designed as one planetary gear, in which case it can, for example, be shiftable. The planetary gear can comprise at least one planetary gear stage. In a shiftable transmission, it is possible to switch between at least two gear stages by means of at least one gear shifting element, in particular a gear shifter. The transmission comprises the transmission cover. The transmission cover is designed to close off the transmission from the drive motor, at least in portions. The transmission cover can be arranged, in particular axially, between the planetary gear, in particular the planetary stage, and the drive motor. The transmission, in particular the planetary gear, can have a ring gear. It is conceivable, for example, that the ring gear and the transmission cover are one piece. It is possible that the intermediate shaft forms a planetary carrier of the planetary gear.

The striking mechanism is designed to be operated in a striking mode. In the striking operating mode, the striking mechanism generates high torque peaks to loosen stuck connecting means or tighten connecting means. The striking mechanism has a beater and a striking mechanism spring connected to the beater so that it cannot rotate. The striking mechanism can be connected to the drive motor by means of the transmission. The striking mechanism can, for example, be designed as a rotary striking mechanism or a V-groove striking mechanism. The striking mechanism can be driven by the intermediate shaft. The striking mechanism can be arranged between the drive motor and the tool holder. The striking mechanism has a striking mechanism housing in which the beater and the striking mechanism spring are arranged. The striking mechanism also comprises a striking mechanism cover. The striking mechanism cover can close off the striking mechanism in the direction of the drive motor. The striking mechanism cover can be arranged between the drive motor and the tool holder, in particular the intermediate shaft, especially the transmission. It is possible that the striking mechanism cover and the transmission cover are one piece, so that the striking mechanism cover forms the ring gear.

The tool holder can be designed as an internal tool holder, for example a bit holder, and/or as an external tool holder, for example a socket holder. It is also conceivable that the tool holder is designed as a drill chuck. The tool holder can accommodate insert tools, such as screwdriver bits or sockets, so that a user can make screw connections between a fastener and a fastener holder.

The hand-held power tool further comprises a power supply, wherein the power supply is provided for cordless operation by means of rechargeable batteries, in particular hand-held power tool rechargeable battery packs, and/or for mains operation. In a preferred embodiment, the power supply is designed for cordless operation. In the context of the disclosure, a "hand-held power tool rechargeable battery pack" is intended to be understood as a combination of at least one rechargeable battery cell and a rechargeable battery pack housing. The hand-held power tool rechargeable battery pack is advantageously designed for supplying power to commonly available cordless hand-held power tools. The at least one rechargeable battery cell can, for instance, be designed as a Li-ion rechargeable battery cell having a nominal voltage of 3.6 V. The hand-held power tool rechargeable battery pack can comprise up to ten rechargeable battery cells, for example, although a different number of rechargeable battery cells is conceivable too. Both an embodiment as a cordless hand-held power tool and operation as a mains-operated hand-held power tool are sufficiently well-known to those skilled in the art, so the specifics of the power supply will not be discussed here.

The hand-held power tool can have an electronic unit at least for controlling the drive motor. The electronic unit can be arranged in the housing. The electronic unit can also be arranged along the tool axis between the transmission and the drive motor. The electronic unit can, for example, be designed as a Hall circuit board for detecting motor signals.

The housing of the hand-held power tool is designed to accommodate at least part of the tool holder, the drive motor, the transmission, the intermediate shaft, and the striking mechanism. The housing can be designed as a shell housing with two half shells.

The drive motor comprises the associated motor component. The motor component can be, for example, a stator of the drive motor, a rotor of the drive motor, motor terminals of the drive motor, motor connections of the drive motor and/or the electronic unit, such as the Hall circuit board. Here, the drive shaft should be excluded from the motor components.

The motor component associated with the drive motor protrudes at least in portions into the transmission cover. For example, an outer circumference of the motor component overlaps at least partially and/or in portions with an inner circumference of the transmission cover. It is also conceivable that an outer circumference of the transmission cover and an outer circumference of the motor component overlap.

In one embodiment, the motor component protrudes into the transmission cover on an end face of the transmission cover facing the drive motor. The transmission cover has the end face, with the end face facing in the direction of the drive motor. The transmission cover has a further end face, wherein the further end face is arranged on the transmission cover facing the tool holder and/or the striking mechanism. The end face of the transmission cover facing the drive motor and the other end face of the transmission cover facing the tool holder are arranged opposite each other.

In one embodiment of the hand-held power tool, the transmission cover has a through-opening into which the motor component projects, in particular in the direction of the transmission. The through-opening can be designed to be circular, elliptical, or polygonal, for example. The drive shaft also protrudes into the through-opening, in particular in the direction of the transmission, in order to engage with the transmission. It is possible for the intermediate shaft to protrude from the through-opening in the direction of the drive motor. The intermediate shaft can have at least one intermediate shaft bearing. The intermediate shaft bearing can be arranged at least partially in and/or on the through-opening.

In one embodiment of the hand-held power tool, the through-opening is at least partially in the form of a ring. In addition to being circular, elliptical, or polygonal, the through-opening can also be at least partially in the form of a ring. The through-opening can, for example, have recesses directed radially in the direction of the tool axis, which are formed in the circumferential direction of the tool axis. It is conceivable that the through-opening has recesses in the circumferential direction of the tool axis that are directed radially away from the tool axis. It is possible that the motor component engages at least partially in the recesses and/or the through-opening which is in the form of a ring.

In one embodiment of the hand-held power tool, the motor component is arranged radially, in particular with respect to the tool axis, at least in portions between the drive shaft and the through-opening of the transmission cover. Starting from the tool axis and directed radially away from the tool axis, the motor component can then be arranged at least in portions between the drive shaft and the through-opening of the transmission cover. The motor component can also be arranged at least partially in the circumferential direction around the tool axis, so that the motor component can be arranged at least in portions coaxially, in particular essentially concentrically, to the drive shaft and the through-opening.

In one embodiment of the hand-held power tool, the motor component is designed as the rotor with a spacer element, with the spacer element projecting into the transmission cover, in particular the through-opening of the transmission cover. The drive motor has the rotor. The rotor is connected to the drive shaft. The rotor has rotor magnets, wherein the rotor magnets are arranged around the drive shaft in the circumferential direction. The spacer element can rest against the rotor, in particular axially. The spacer element can, for example, be designed as a spacer sleeve, a spacer plate, a spacer disk, or a motor spacer. The spacer element is designed to distance the rotor magnets from other components. The other components can be, for example, bearings such as the drive shaft bearing or the intermediate shaft bearing, or the transmission cover. The spacer element is made of an electrically insulating material. The spacer element is designed to secure the rotor magnets axially so that the rotor magnets remain in position relative to the drive shaft.

In one embodiment of the hand-held power tool, the drive shaft bearing is arranged radially, in particular with respect to the tool axis, between the drive shaft and the intermediate shaft of the transmission, with the spacer element of the rotor of the motor component resting against the drive shaft bearing. Here, the spacer element can rest against an inner housing, in particular an inner ring, of the drive shaft bearing.

In one embodiment of the hand-held power tool, the spacer element has at least one collar that projects into a through-opening in the intermediate shaft. The collar can rest against the drive shaft bearing. The collar can be at least partially circumferential. For example, instead of the collar, the spacer element can also have a bar or a projection. The through-opening of the intermediate shaft can be circular, elliptical, or polygonal, for example.

In one embodiment of the hand-held power tool, the motor component is designed as the motor terminals and/or the motor connections of the stator, which protrude at least partially into the transmission cover, in particular the through-opening of the transmission cover. The motor terminals and/or the motor connections are used to control at least the drive motor and protrude at least partially into the transmission cover.

In one embodiment of the hand-held power tool, the motor terminals and/or the motor connections are arranged radially, in particular with respect to the tool axis, at least in portions between the intermediate shaft of the transmission and the through-opening of the transmission. This can reduce the overall length of the hand-held power tool.

In one embodiment of the hand-held power tool, the transmission cover has a receiving region on an end face facing the stator for receiving the at least one motor component at least in portions. The receiving region can be formed on the transmission cover in the circumferential direction of the tool axis. The receiving region can be formed on an outer circumference of the transmission cover.

In one embodiment, the receiving region is arranged at least partially between the motor terminals of the stator and the motor connections of the stator. For example, the motor terminals can engage in the through-opening of the transmission cover, with the motor connections engaging in the receiving region on the outer circumference of the transmission cover. Therefore, the receiving region and the through-opening of the transmission cover can be arranged at least partially radially, in particular in relation to the tool axis, between the motor terminals and the motor connections.

BRIEF DESCRIPTION OF THE DRAWINGS

The disclosure is explained in more detail in the following with reference to a preferred embodiment. In the following, the drawings show.

DETAILED DESCRIPTION

Figure 1:
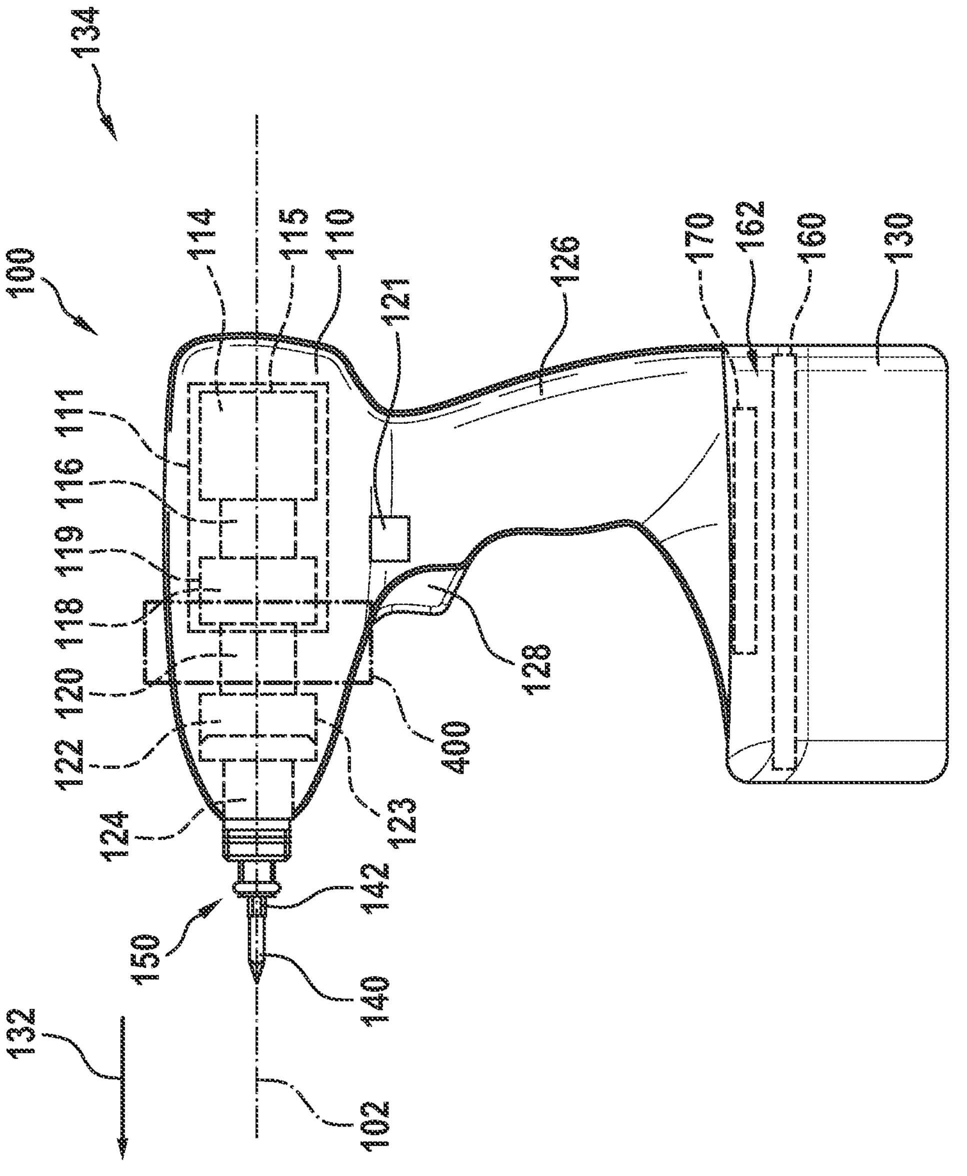
FIG. 1 a schematic view of a hand-held power tool according to the disclosure.

FIG. 1 shows a hand-held power tool 100 according to the disclosure, which is designed here for example as a cordless rotary impact screwdriver. The hand-held power tool 100 comprises a pinion shaft 124, a tool holder 150, and a striking mechanism 122, for example a rotary or rotational striking mechanism. The hand-held power tool 100 comprises a housing 110 with a handle 126. To provide a mains-independent power supply, the hand-held power tool 100 can be mechanically and electrically connected to a power supply for cordless operation, so that the hand-held power tool 100 is designed as a cordless hand-held power tool 100. A hand-held power tool rechargeable battery pack 130 is used here as the power supply. However, the disclosure is not limited to cordless hand-held power tools, but can also be applied to mains-dependent, i.e., mains-powered, hand-held power tools.

The housing 110 comprises a drive unit 111 and the striking mechanism 122, wherein the drive unit 111 and the striking mechanism 122 are arranged in the housing 110. The drive unit 111 comprises an electrically commutated drive motor 114, which is supplied with power by the hand-held power tool rechargeable battery pack 130, and a transmission 118. The transmission 118 is designed as at least one planetary gear 166, see also FIG. 2. The drive motor 114 is designed such that it can be actuated, for example via a manual switch 128, so that the drive motor 114 can be switched on and off. The drive motor 114 can advantageously be electronically controlled and/or regulated, so that a reversing mode and a desired rotational speed can be implemented. For the reversing mode, the hand-held power tool 100 comprises a rotation direction switching element 121 designed as a rotation direction changeover switch. The rotation direction switching element 121 is designed to switch the drive motor 114 between a clockwise direction of rotation and a counterclockwise direction of rotation. The design and mode of operation of a suitable drive motor are well known to those skilled in the art, which is why they will not be discussed in detail here.

The transmission 118 is connected to the drive motor 114 via a drive shaft 116. The drive shaft 116 is mounted in the housing 110 by means of a drive shaft bearing 117. The transmission 118 is intended to convert a rotation of the drive shaft 116 into a rotation between the transmission 118 and the striking mechanism 122 via an intermediate shaft 120. Preferably, this conversion takes place in such a way that the intermediate shaft 120 rotates relative to the drive shaft 116 with increased torque, but at a reduced rotational speed, see also FIG. 2. The intermediate shaft 120 drives the striking mechanism 122 at least partially. The transmission 118 comprises a transmission housing 119, which is arranged in the housing 110. The hand-held power tool 100 comprises a tool axis 102, wherein a rotational axis of the drive shaft 116 forms the tool axis 102.

Figure 2:
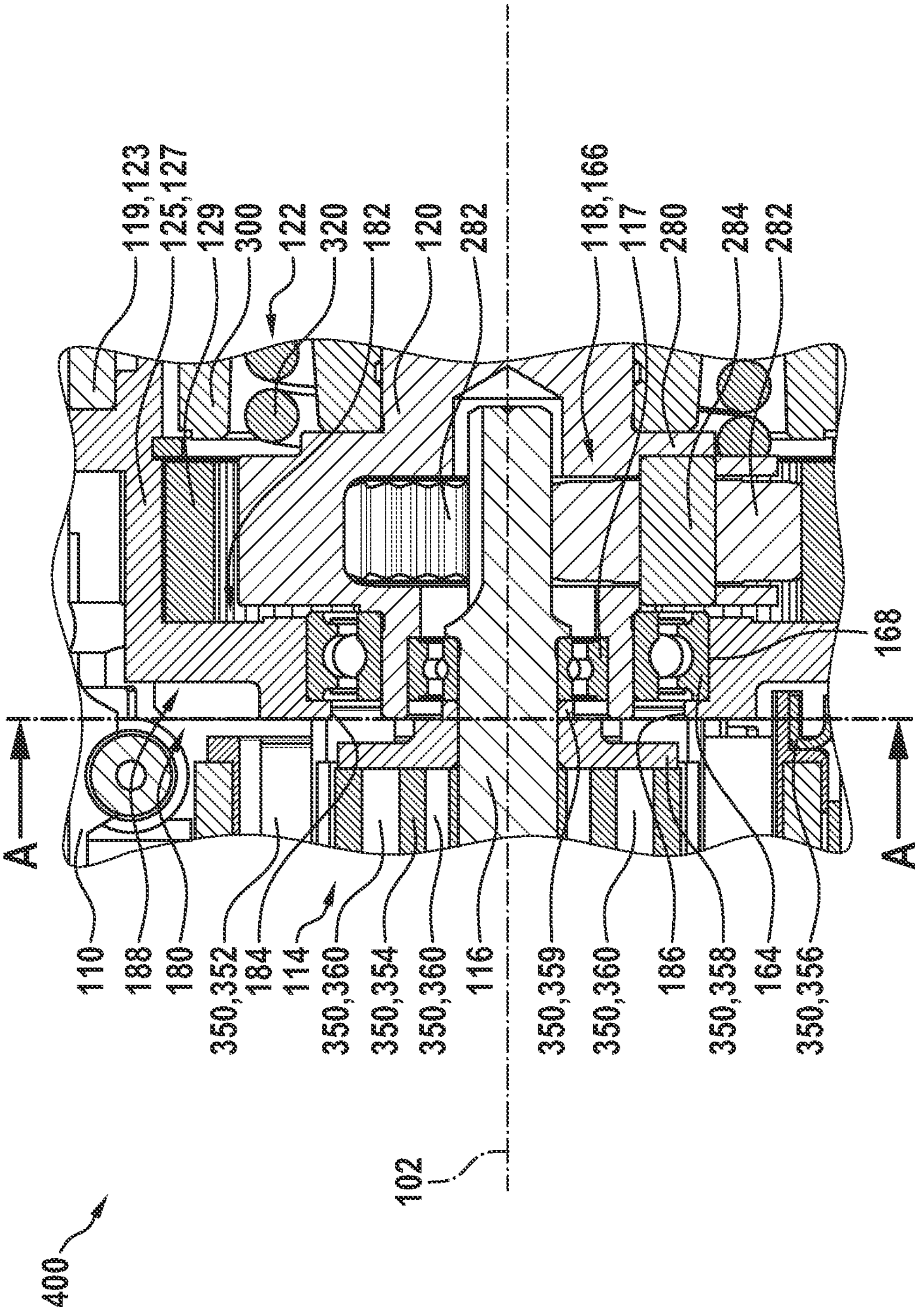
FIG. 2 a section of a longitudinal cross-section of the hand-held power tool.

The striking mechanism 122 is connected to the intermediate shaft 120 and comprises a beater 300 and a striking mechanism spring 320, wherein the striking mechanism 122 generates impact-like rotary pulses with high intensity during a striking operation, see also FIG. 2. The striking mechanism 122 comprises a striking mechanism housing 123, wherein the striking mechanism 122 can also be arranged in another suitable housing, such as the transmission housing 119. The striking mechanism 122 is designed to drive the pinion shaft 124. The tool holder 150 is provided on the pinion shaft 124. The tool holder 150 is preferably integrally formed with and/or designed on the pinion shaft 124. The tool holder 150 is preferably arranged in an axial direction 132 facing away from the drive unit 111. The tool holder 150 is designed here as a hexagon socket, in the form of a bit holder, which is provided to accommodate an insert tool 140. The insert tool is designed in the form of a screwdriver bit comprising a polygonal external coupling 142. The type of the screwdriver bit, for example HEX type, is sufficiently well-known to those skilled in the art. The disclosure is not limited to the use of HEX screwdriver bits, however; other tool holders that appear useful to those skilled in the art, such as HEX drills, SDS quick-insert tools, or round-shank drill chucks, can be used as well. In addition, the design and function of a suitable bit holder are well known to the skilled person.

The hand-held power tool 100 comprises a control unit 170 at least for controlling the drive unit 111, in particular the drive motor 114. The housing 110 at least partially accommodates the control unit 170. The control unit 170 comprises a microprocessor not shown in detail. In addition, the housing 110 comprises a power supply holding device 160. The power supply holding device 160 accommodates the hand-held power tool rechargeable battery pack 130 and forms a base 162 comprising a standing surface. The hand-held power tool rechargeable battery pack 130 can be released from the power supply holding device 160 without tools. The housing 110 also comprises the handle 126 and the power supply holding device 160. The handle 126 can be grasped by the user. In one embodiment, the power supply holding device 160 is arranged on the handle 126. The hand-held power tool 100 can be set down on the base 162.

FIG. 2 shows a section 400 of a longitudinal section of the hand-held power tool 100. The striking mechanism 122, the intermediate shaft 120, and the transmission 118 are shown, with the intermediate shaft 120 forming part of the transmission 118 as an example. The intermediate shaft 120 is arranged between the drive motor 114 and the tool holder 150, wherein the tool holder 150 is not shown. The transmission 118 is designed as the planetary gear 166, wherein a planetary stage is formed here as an example. In addition to the transmission housing 119, the transmission 118 comprises a transmission cover 125. Here, the transmission cover 125 is intended to at least partially close the transmission 118 with respect to the drive motor 114. The transmission cover 125 is arranged between the planetary gear 166 and the drive motor 114. In addition, the planetary gear 166 comprises a ring gear 129. The intermediate shaft 120 comprises an intermediate shaft bearing 164. The transmission cover 125 comprises a holder 168 for the intermediate shaft bearing 164, such that the holder 168 for the intermediate shaft bearing 164 receives the intermediate shaft bearing 164. The drive shaft 116 protrudes into the transmission cover 125.

The striking mechanism 122 is connected to the drive motor 114 by means of the planetary gear 166. The striking mechanism 122 is designed here as a V-groove striking mechanism. The striking mechanism 122 is arranged between the drive motor 114 and the tool holder 150. The beater 300 and the striking mechanism spring 320 are arranged in the striking mechanism housing 123. The striking mechanism 122 comprises a striking mechanism cover 127, wherein the striking mechanism cover 127 closes off the striking mechanism 122 in the direction of the drive motor 114. The striking mechanism cover 127 is arranged between the drive motor 114 and the planetary gear 166. In this example, the striking mechanism cover 127 and the transmission cover 125 are in one piece.

The planetary gear 166 comprises a planetary carrier 280. In addition to the planetary carrier 280, the planetary gear 166 comprises a plurality of planetary wheels 282 and bearing pins 284. The bearing pins 284 are intended to rotatably connect the planetary wheels 282 to the planetary carrier 280. The intermediate shaft 120 and the planetary carrier 280 are exemplarily one piece.

At least one motor component 350 associated with the drive motor 114 protrudes at least in portions into the transmission cover 125. The motor component 350 here comprises, for example, a stator 352 of the drive motor 114, a rotor 354 of the drive motor 114, and motor terminals 356 of the drive motor 114, see also FIG. 3. The drive shaft 114 should be excluded from the motor components 350. The motor component 350 protrudes at least in portions into the transmission cover 125. For example, an outer circumference of the motor component overlaps at least partially and/or in portions with an inner circumference of the transmission cover, see also FIG. 3.

The motor component 350 protrudes into the transmission cover 125 at an end face 180 of the transmission cover 125 facing the drive motor 114. The end face 180 of the transmission cover 125 faces in the direction of the drive motor 114. The transmission cover 125 comprises a further end face 182. The other end face 182 faces the striking mechanism 122. The transmission cover 125 comprises a through-opening 184. The motor component 350 and the drive shaft 116 protrude into the through-opening 184. In this example, the through-opening 184 is circular in shape. The intermediate shaft bearing 164 is arranged at least partially at the through-opening 184. The motor component 350 is arranged radially to the tool axis 102 at least in portions between the drive shaft 116 and the through-opening 184 of the transmission cover 125.

The motor component 350, shaped as the rotor 354 with a spacer element 358, projects into the through-opening 184. The spacer element 358 protrudes into the through-opening 184 of the transmission cover 125. The rotor 354 is connected to the drive shaft 114. The rotor also comprises 354 rotor magnets 360. The rotor magnets 360 are arranged circumferentially around the drive shaft 116. The spacer element 358 rests axially against the rotor 354. Here, the spacer element 360 is shaped as a spacer sleeve. The drive shaft bearing 117 is arranged radially to the tool axis 102 between the drive shaft 116 and the intermediate shaft 120. The spacer element 360 of the rotor 354 rests against the drive shaft bearing 117. The spacer element 358 comprises a collar 359, which in this example is of circumferential design. The collar 359 protrudes into a through-opening 186 of the intermediate shaft 120, wherein the through-opening 186 of the intermediate shaft 120 is circular in shape. The collar 359 rests against the drive shaft bearing 117. The motor component 350 formed as the motor terminals 356 protrudes at least partially into the transmission cover 125, see also FIG. 3.

Figure 3:
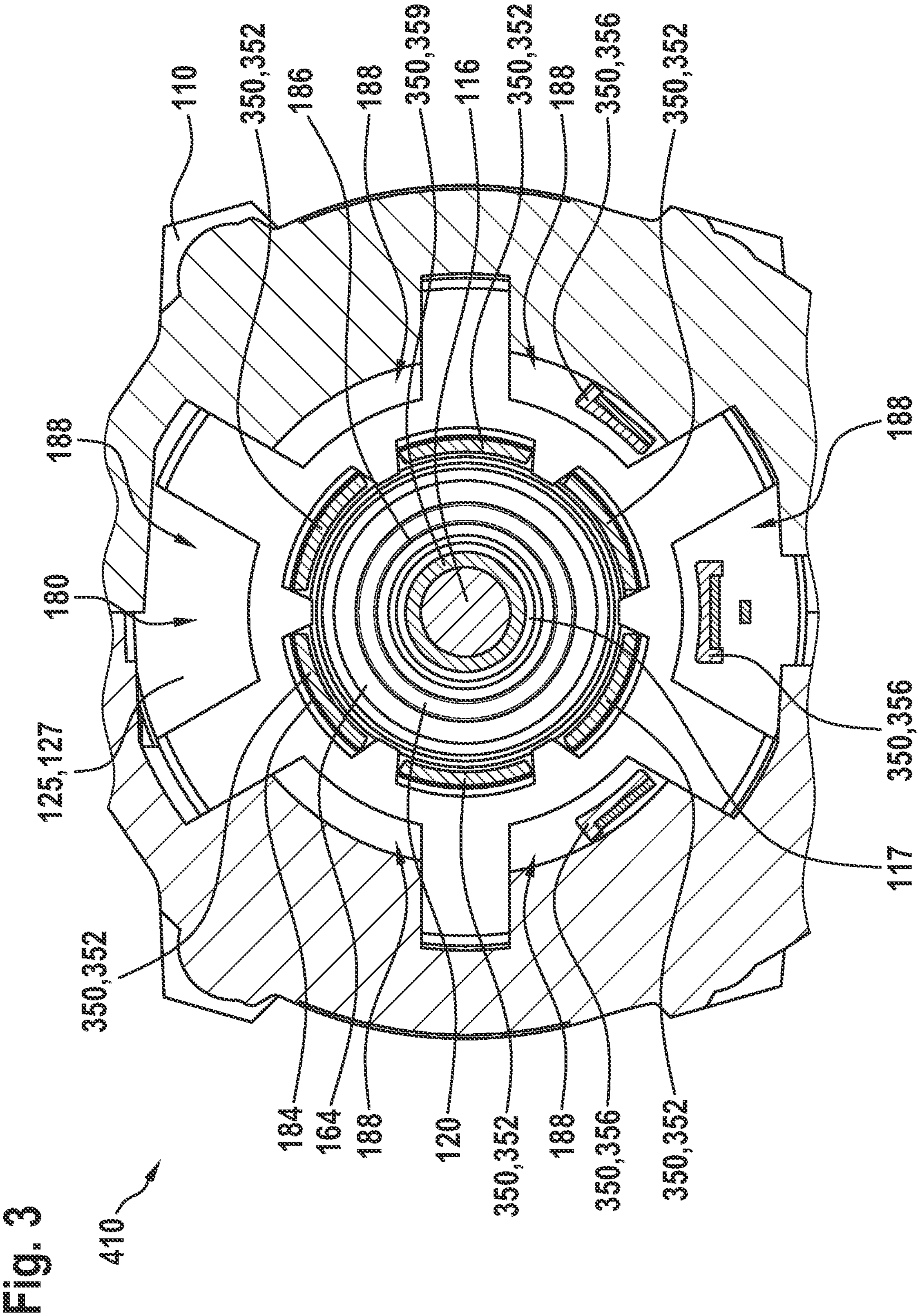
FIG. 3 a section of a cross-section of the hand-held power tool.

On the end face 180 facing the stator 352, the transmission cover 125 comprises a receiving region 188 for receiving the at least one motor component 350 at least in portions, see also FIG. 3. The receiving region 188 is formed on the transmission cover 125 in the circumferential direction relative to the tool axis 102 and forms an outer circumference of the transmission cover 125. In addition, the receiving region 188 is in the form of a ring.

FIG. 3 shows a section 410 of a cross-section of the hand-held power tool 100, in direction A-A, as shown in FIG. 2. At least an outer circumference of the motor component 350 at least partially overlaps the inner circumference of the transmission cover 125. The stator 352 and the spacer element 358, in particular the collar 359, protrude into the through-opening 184 of the transmission cover 125. The through-opening 184 is at least partially in the form of a ring. In this case, the through-opening 184 comprises recesses directed radially in the direction of the tool axis 102, which are formed in the circumferential direction relative to the tool axis 102. The motor components are arranged at least partially in the circumferential direction around the tool axis 102. The motor components 350 are arranged at least in portions coaxially to the drive shaft 116 and the through-opening 184.

What is claimed is:

1. A hand-held power tool, comprising:

a drive motor comprising a drive shaft; and a transmission operably connected to the drive shaft and configured to be driven by the drive shaft, the transmission comprising at least one transmission cover configured to close the transmission at least in portions, the at least one transmission cover arranged at least partially between the drive motor and the transmission, wherein at least one motor component assigned to the drive motor projects at least in portions into the at least one transmission cover, and wherein the at least one transmission cover comprises a through-opening into which the at least one motor component projects.

2. The hand-held power tool according to claim 1, wherein the through-opening is at least partially in the form of a ring.

3. The hand-held power tool according to claim 1, wherein the at least one motor component is arranged radially at least in portions between the drive shaft and the through-opening.

4. The hand-held power tool according to claim 1, wherein:

the at least one motor component is configured as a rotor with a spacer element, and the spacer element projects into the at least one transmission cover through the through-opening.

5. The hand-held power tool according to claim 4, further comprising:

a drive shaft bearing arranged radially between the drive shaft and an intermediate shaft of the transmission, wherein the spacer element is configured to rest against the drive shaft bearing.

6. The hand-held power tool according to claim 5, wherein the spacer element comprises at least one collar configured to project into a through-opening of the intermediate shaft.

7. The hand-held power tool according to claim 1, wherein:

the at least one motor component includes a stator, and the stator is configured to project at least partially into the at least one transmission cover through the through-opening.

8. The hand-held power tool according to claim 7, wherein the stator is arranged radially at least in portions between an intermediate shaft of the transmission and the through-opening.

9. The hand-held power tool according to claim 1, wherein:

the at least one transmission cover comprises a receiving region located on an end face facing a stator of the drive motor, and the receiving region is configured to receive the at least one motor component at least in portions.

10. The hand-held power tool according to claim 1, wherein:

the at least one motor component includes a stator; and the stator is configured to project at least partially into the at least one transmission cover through the through-opening.

11. The hand-held power tool according to claim 10, wherein the stator is arranged radially at least in portions between an intermediate shaft of the transmission and the through-opening.

12. The hand-held power tool according to claim 11, wherein:

the at least one transmission cover comprises a receiving region located on an end face facing the stator of the drive motor;

the at least one motor component further comprises a motor terminal; and the receiving region is configured to receive the motor terminal at least in portions.

13. The hand-held power tool according to claim 12, wherein the receiving region is located radially outwardly of the through-opening.

14. A hand-held power tool, comprising:

a drive motor comprising a drive shaft; and a transmission operably connected to the drive shaft and configured to be driven by the drive shaft, the transmission comprising at least one transmission cover configured to close the transmission at least in portions, the at least one transmission cover arranged at least partially between the drive motor and the transmission, wherein at least one motor component assigned to the drive motor projects at least in portions into the at least one transmission cover, wherein:

the at least one transmission cover comprises a receiving region located on an end face facing a stator of the drive motor, and the receiving region is configured to receive the at least one motor component at least in portions.

* * * * *